(12) United States Patent
Wei et al.

(10) Patent No.: US 12,052,788 B2
(45) Date of Patent: Jul. 30, 2024

(54) BEAM FAILURE RECOVERY AND RADIO LINK FAILURE ASSOCIATION IN FIFTH GENERATION (5G)-NEW RADIO (NR)

(71) Applicant: Apple Inc., Cupertino, CA (US)

(72) Inventors: Lili Wei, Portland, OR (US); Qian Li, Beaverton, OR (US); Dawei Ying, Hillsboro, OR (US); Daewon Lee, Portland, OR (US); Yushu Zhang, Beijing (CN); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 17/270,914

(22) PCT Filed: Sep. 25, 2019

(86) PCT No.: PCT/US2019/052910
§ 371 (c)(1),
(2) Date: Feb. 24, 2021

(87) PCT Pub. No.: WO2020/068948
PCT Pub. Date: Apr. 2, 2020

(65) Prior Publication Data
US 2021/0219370 A1 Jul. 15, 2021

Related U.S. Application Data

(60) Provisional application No. 62/739,076, filed on Sep. 28, 2018.

(51) Int. Cl.
*H04J 3/14* (2006.01)
*H04B 7/0408* (2017.01)
(Continued)

(52) U.S. Cl.
CPC .......... *H04W 76/19* (2018.02); *H04B 7/0408* (2013.01); *H04B 7/0695* (2013.01)

(58) Field of Classification Search
CPC .... H04W 76/19; H04B 7/0408; H04B 7/0695
(Continued)

(56) References Cited

U.S. PATENT DOCUMENTS

2017/0223561 A1\* 8/2017 Radulescu ............ H04W 72/23
2018/0219604 A1 8/2018 Lu et al.
(Continued)

FOREIGN PATENT DOCUMENTS

CN 105144774 A 12/2015
CN 107567038 A 1/2018
(Continued)

OTHER PUBLICATIONS

"Supplementary Partial European Search Report for European Patent Application 19865152.3", dated Mar. 16, 2022, 15 Pages.
(Continued)

*Primary Examiner* — Chuong T Ho
(74) *Attorney, Agent, or Firm* — Eschweiler & Potashnik, LLC

(57) ABSTRACT

Techniques discussed herein can facilitate reduced frequency of triggering a RLF (Radio Link Failure) timer and/or a false RLF procedure via employing one or more mechanisms for associating BFR (Beam Failure Recovery) and RLF. A first mechanism that can be employed in various embodiments can perform one or more RLF-related actions (e.g., stopping a T310 timer, resetting a N310 counter) upon BFR success. A second mechanism that can be employed in various embodiments can comprise revising one or more RLF parameters (e.g., N310, N311, T310, Out-of-sync threshold, in-sync threshold, etc.) based on the presence of a strong BFR mechanism.

15 Claims, 6 Drawing Sheets

(51) Int. Cl.
*H04B 7/06* (2006.01)
*H04W 76/19* (2018.01)

(58) Field of Classification Search
USPC .......................................................... 370/216
See application file for complete search history.

(56) References Cited

U.S. PATENT DOCUMENTS

| | | | | |
|---|---|---|---|---|
| 2019/0254042 A1* | 8/2019 | Cirik | ..................... | H04L 5/0048 |
| 2019/0349061 A1* | 11/2019 | Cirik | ..................... | H04L 1/1861 |
| 2020/0059285 A1* | 2/2020 | Zhang | ............... | H04W 74/0833 |
| 2020/0092785 A1* | 3/2020 | Yang | ..................... | H04W 36/06 |
| 2021/0168678 A1* | 6/2021 | Deenoo | ................. | H04W 76/19 |
| 2021/0321277 A1* | 10/2021 | Murray | ............... | H04W 56/001 |

FOREIGN PATENT DOCUMENTS

| | | |
|---|---|---|
| WO | 2017164908 A1 | 9/2017 |
| WO | 2018237400 A1 | 12/2018 |

OTHER PUBLICATIONS

"Views on beam recovery", In 3GPP TSG RAN WG1 Meeting #90b, Oct. 9-13, 2017, 9 Pages.

International Search Report dated Jan. 9, 2020 for International Application No. PCT/US2019/052910.
"Impact of Beam Failure Recovery on RLF related actions." Source: Nokia, Nokia Shanghai Bell. Agenda Item: 10.2.8. 3GPP TSG RAN WG2 Meeting #101, Athens, Greece, Feb. 26-Mar. 2, 2018. R2-1802071 (update of R2-1801027).
"Discussion on aperiodic indications from beam failure." Source: Samsung. Agenda Item: 10.2.8. 3GPP TSG-RAN2#101, Athens, Greece, Feb. 26-Mar. 2, 2018. R2-1802459 (Revision of R2-1801413).
"Discussion on BeamFailureReceoveryTimer." Source: Huawei, HiSilicon. Agenda Item: 10.3.1.4.2. 3GPP TSG-RAN WG2 Meeting 102, Busan, Korea, May 21-25, 2018. R2-1807970.
"Remaining Issues for Beam Failure Recovery Procedure." Source: ASUSTek. Agenda Item: 7.1.2.2.4. 3GPP TSG RAN WG Meeting #92, Athens, Greece, Feb. 26-Mar. 2, 2018. R1-1802071.
International Preliminary Report on Patentability dated Mar. 23, 2021 for International Application No. PCT/US2019/052910.
Chinese Office Action for Chinese Application No. 201980063236.0, dated Dec. 29, 2023.
3GPP TSG RAN WG2 Meeting #101; Nokia et al. Impact of Beam Failure Recovery on RLF related actions; Feb. 13, 2018.
3GPP TSG RAN WG1 Meeting #90b; NTT Docomo, Views on beam recovery; Oct. 2, 2017.
3GPP TSG-RAN2#101; Samsung,Discussion on aperiodic indications from beam failure recovery to assist RLF; Feb. 14, 2018.

* cited by examiner

BEAM FAILURE RECOVERY AND RADIO LINK FAILURE ASSOCIATION IN FIFTH GENERATION (5G)-NEW RADIO (NR)

REFERENCE TO RELATED APPLICATIONS

This application is a National Phase entry application of International Patent Application No. PCT/US2019/052910 filed Sep. 25, 2019, which claims priority to U.S. Provisional Application Patent Application 62/739,076 filed on Sep. 28, 2018, entitled "Beam Failure Recovery and Radio Link Failure Association in 5G-NR" and is hereby incorporated by reference in its entirety.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate transmit diversity in connection with power saving signals.

Figure 1:
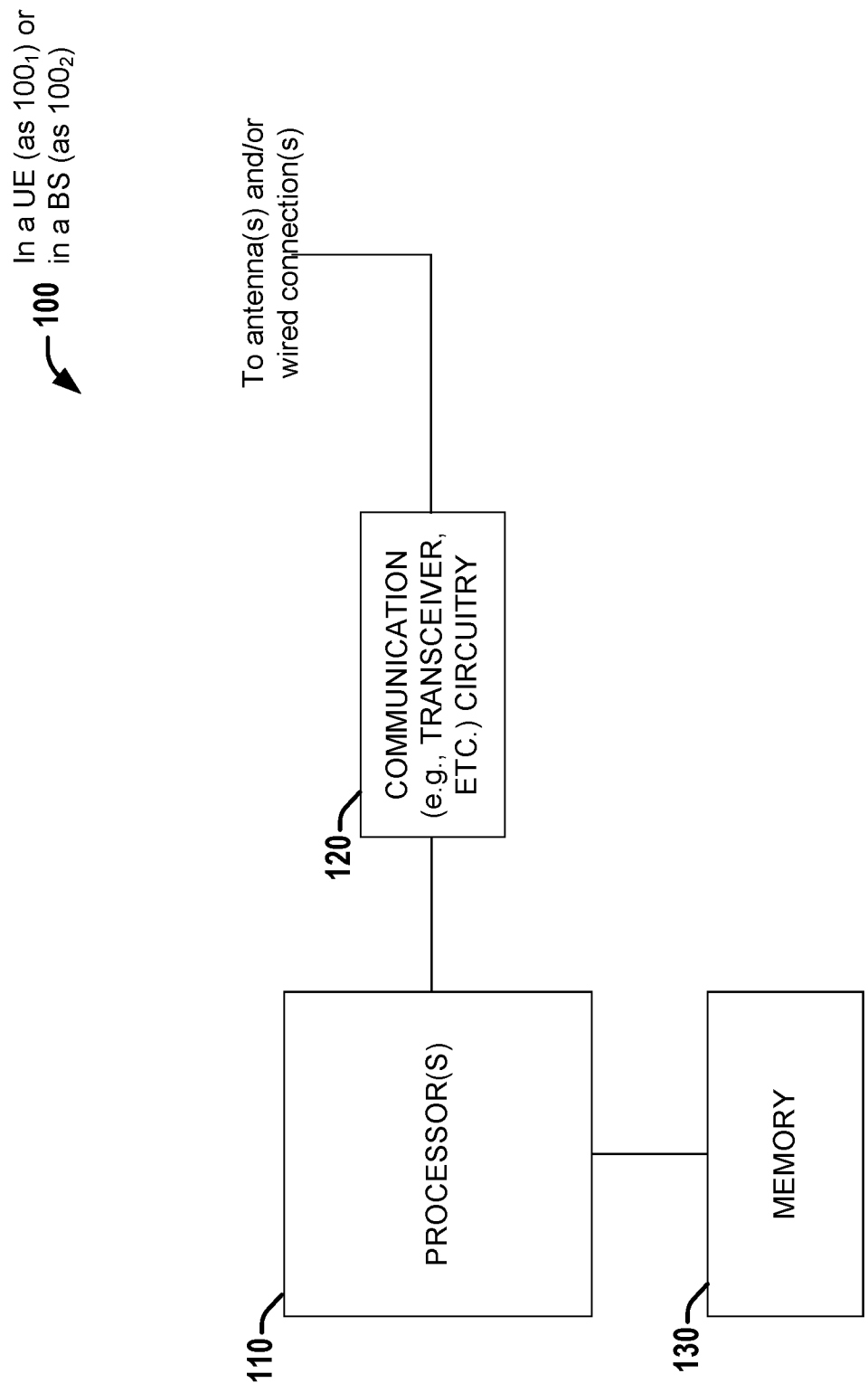
FIG. 1 is a block diagram illustrating a system employable at a UE (User Equipment) or BS (Base Station) that facilitates association(s) between beam failure recovery and radio link failure, according to various aspects described herein.

Referring to FIG. 1, illustrated is a block diagram of a system 100 employable at a UE (User Equipment) (e.g., as system $100_1$) or a BS (Base Station) (e.g., as system $100_2$) that facilitates association(s) between beam failure recovery and radio link failure, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). In various aspects, system 100 can be included within a user equipment (UE). In BS aspects, system $100_2$ can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network, wherein processor(s) 1102, communication circuitry 1202, and memory 1302 can be in a single device or can be included in different devices, such as part of a distributed architecture. In embodiments, signaling from a UE to a BS can be generated by processor(s) 1101, transmitted by communication circuitry 1201, received by communication circuitry 1202, and processed by processor(s) 1102, while signaling from a BS to a UE (e.g., including configuration of a UE) can be generated by processor(s) 1102, transmitted by communication circuitry 1202, received by communication circuitry 1201, and processed by processor(s) 1101.

The beam-based air interface is an important characteristic of 5G (Fifth Generation) NR (New Radio) and has been extensively discussed for initial access, beam management, beam failure recovery (BFR), etc. However, 5G NR currently has no specific or concrete association defined or discussed between BFR and RLF (Radio Link Failure). In various embodiments, based on the BFR mechanism in 5G NR, the existing RLF mechanism can be enhanced and/or associated accordingly to avoid frequent triggering of the RLF timer and false RLF procedures. In various embodiments, techniques can be employed to facilitate one or both of two BFR/RLF association mechanisms discussed herein: (1) Performing one or more actions upon BFR success and/or (2) Revising one or more RLF parameters according to the BFR mechanism.

By associating BFR and RLF mechanisms of 5G NR, embodiments discussed herein can reduce the rate of RLF timer triggering compared to existing 5G NR systems, and can also reduce the number of false RLF procedures compared to existing 5G NR systems. In turn, this can improve the efficiency and reliability of communications in 5G NR systems.

As noted, one feature distinguishing 5G NR from earlier 3GPP (Third Generation Partnership Project) RATs (Radio Access Technologies) is support for a massive number of steerable antenna elements for both transmission (Tx) and reception (Rx). Hence, the beam-based air interface is an important characteristic of 5G NR, and has been extensively discussed for initial access, beam management, beam failure recovery, etc.

Figure 2:
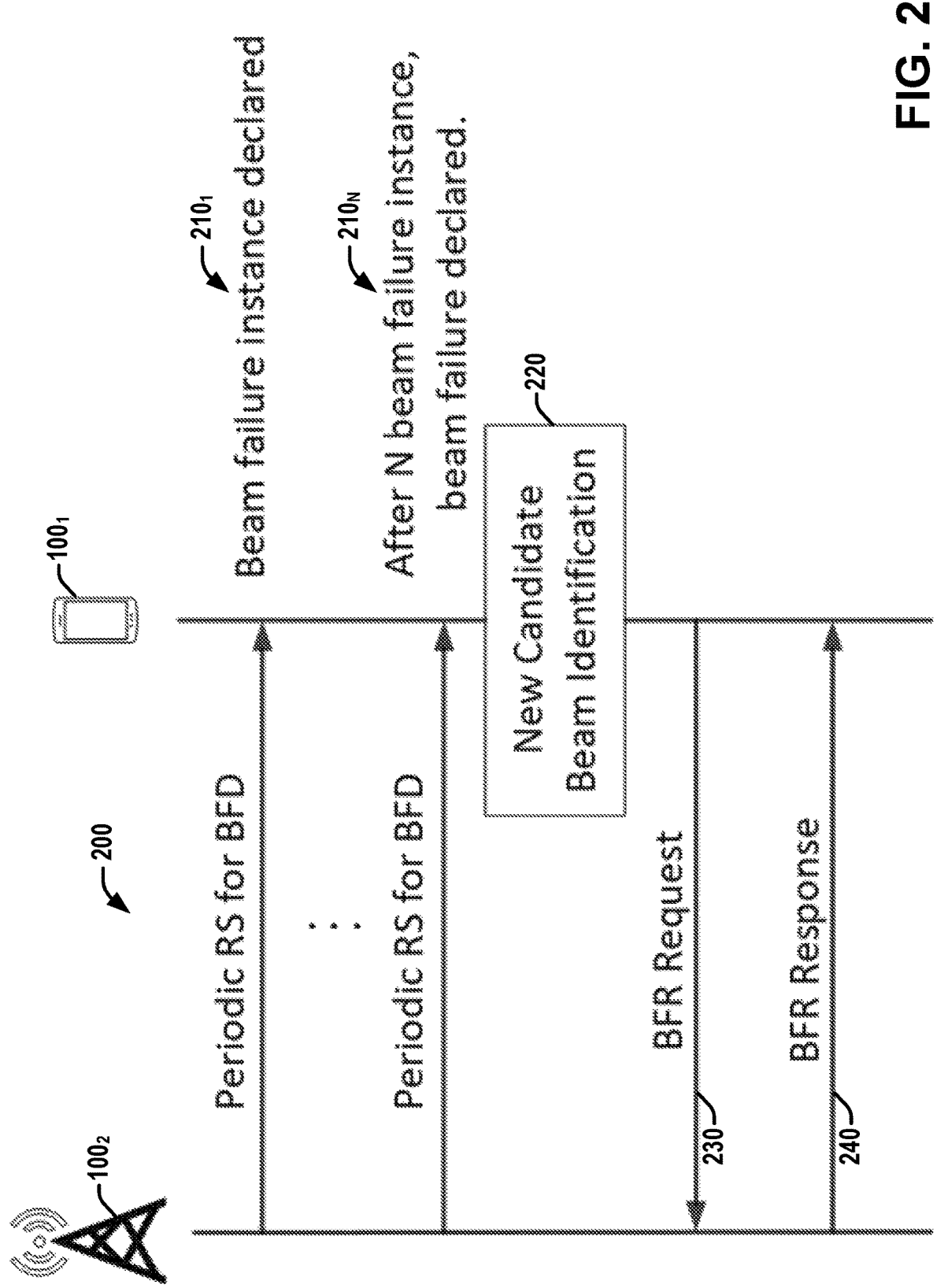
FIG. 2 is a diagram illustrating a beam failure recovery (BFR) mechanism 200 for 5G (Fifth Generation) NR (New Radio), in connection with various aspects discussed herein.

Referring to FIG. 2, illustrated is a diagram showing a beam failure recovery (BFR) mechanism 200 for 5G NR, in connection with various aspects discussed herein. The BFR mechanism 200 can comprise the following four aspects illustrated in FIG. 2: (a) Beam failure detection (BFD), wherein beam failure can be identified after N beam failure instances are declared (at 210₁-210ₙ), for example, based on periodic RS (Reference Signal(s)) for BFD transmitted by a gNB 100₂ that are not decoded by the UE 100₁ (e.g., due to insufficient RSRP (RS Received Power)); (b) New candidate beam identification at 220 by the UE 100₁; (c) transmission of a Beam failure recovery request transmission at 230 from the UE 100₁ to gNB 100₂; and (d) monitoring by a UE 100₁ for a response 240 from the gNB 100₂ to the beam failure recovery request at 230.

Figure 3:
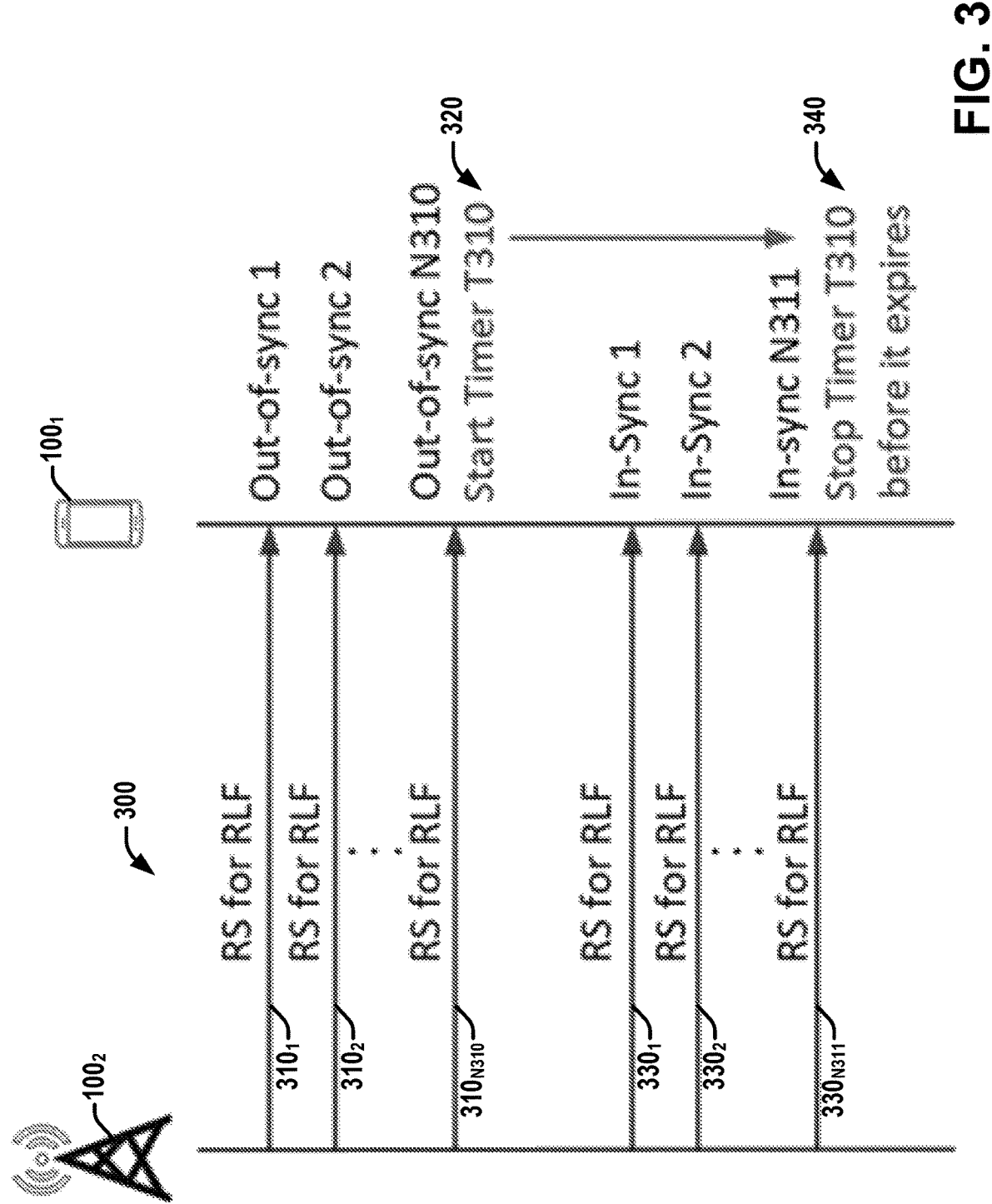
FIG. 3 is a diagram illustrating an example procedure wherein timer T310 stops before it expires, in connection with various aspects discussed herein.
Figure 4:
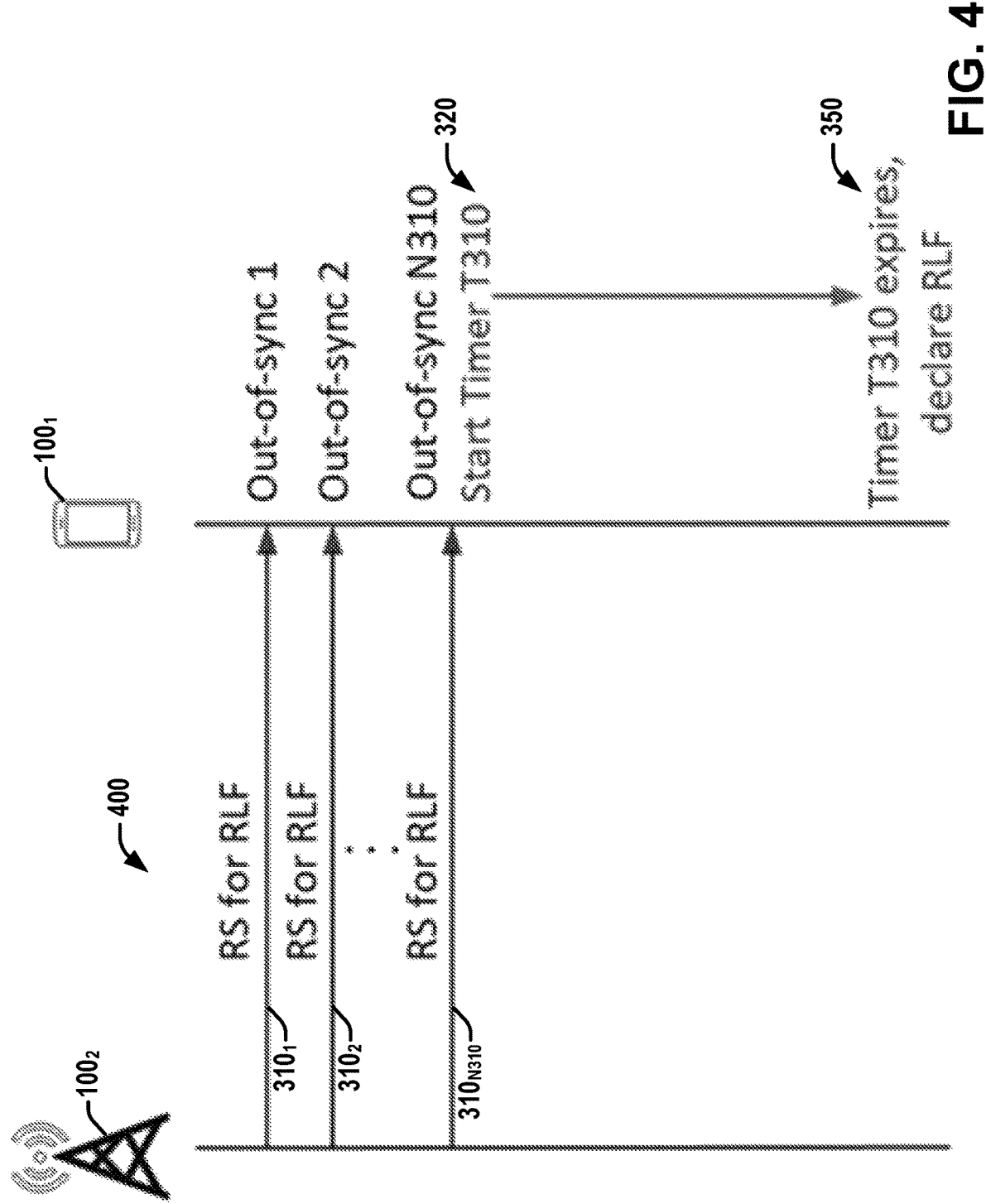
FIG. 4 is a diagram illustrating an example procedure wherein timer T310 expires and RLF is declared, in connection with various aspects discussed herein.

For radio link failure (RLF), in the current NR specification (3GPP (Third Generation Partnership Project) TS (Technical Specification) 38.331), RLF related actions comprise the procedures discussed below and illustrated in FIGS. 3-4. Referring to FIG. 3, illustrated is a diagram of an example procedure 300 wherein timer T310 stops before it expires, in connection with various aspects discussed herein. Referring to FIG. 4, illustrated is a diagram of an example procedure 400 wherein timer T310 expires and RLF is declared, in connection with various aspects discussed herein.

When a UE receives N310 (where N310 is an integer counter) consecutive out-of-sync (OOS) indications (310₁-310_{N310}) from lower layers (which indicates N310 times of 200 ms intervals when the UE is unable to successfully decode the physical downlink control channel (PDCCH) due to low reference signal received power (RSRP) detected), while timer T311 is not running (which indicates the UE is not currently under RRC reconnection procedure), the timer T310 starts, shown at 320 in FIGS. 3-4.

While T310 is running, when the UE receives N311 (where N311 is an integer counter) consecutive in-sync indications (330₁-330_{N311}) from lower layers (which indicates N311 times of 100 ms intervals that the UE successfully decodes the PDCCH), the UE stops the timer T310 (shown at 340 in FIG. 3) and the link has not failed.

Upon T310 expiry (shown at 350 in FIG. 4), the UE considers RLF detected.

When RLF happens after T310 expires, the UE can go through a RRC (Radio Resource Control) Connection Re-establishment procedure.

In existing 5G NR systems, there is no specific and/or concrete BFR and RLF association defined or discussed. Accordingly, in various embodiments, based on the BFR mechanism in 5G NR, the RLF mechanism can be enhanced and/or associated accordingly to avoid frequently trigger of RLF timer and false RLF procedure. Various embodiments can employ one or both of two aspects of BFR/RLF association discussed herein: (1) Actions upon BFR success and/or (2) Revising RLF parameters according to the BFR mechanism.

BFR/RLF Association: Actions Upon BFR Success

In various aspects, beam failure detection and radio link failure detection can be implicitly correlated since they can be configured to measure the same reference signals (RSs). Hence, when beam failure is detected by a UE 100₁, the radio link failure timer T310 can also be triggered to start by the UE 100₁. But BFR and RLF can have different reporting mechanisms. For example, the beam failure can happen between the base station 100₂ and a UE 100₁ which triggered the timer T310, while later BFR is successful. But if the in-sync indications (e.g., as shown in FIG. 3 at 330₁) are not received on time before T310 expiry, the result will be a false RLF declaration by UE 100₁. Thus, in such an example, a UE 100₁ employing an embodiment discussed herein can implement one or more actions discussed herein to minimize the rate of false RLF declaration, such as stopping Timer T310 upon BFR success.

In another example scenario, beam failure detection could be faster than radio link monitor. In such a scenario, it could happen that the BFR procedure is completed while UE 100₁ is still doing radio link monitoring. Then, if BFR is successful while the number of OOS (Out-of-Sync) detections does not reach N310, UE 100₁ can reset counter N310.

Hence, in various embodiments, upon BFR success, one or more of the following actions can be taken by UE 100₁: (1) If Timer T310 has been triggered by UE 100₁ and has not expired, UE 100₁ can stop Timer T310 (as would be done if N311 in-sync indications had been detected by UE 100₁) and/or (2) If radio link monitoring is still in process at UE 100₁ and out-of-sync detection by UE 100₁ has not yet reached N310, UE 100₁ can reset counter N310.

Figure 5:
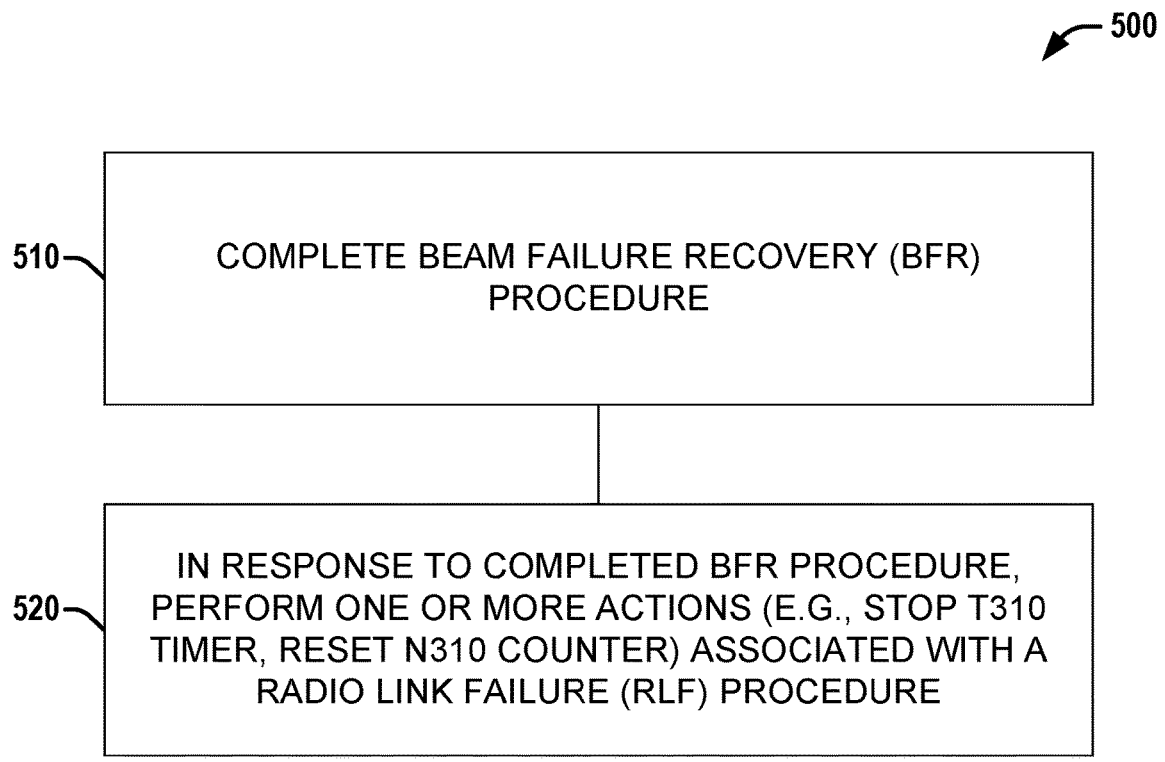
FIG. 5 is a flow diagram illustrating an example method employable at a UE that facilitates one or more RLF (Radio Link Failure)—related actions upon BFR success, according to various aspects discussed herein.

Referring to FIG. 5, illustrated is a flow diagram of an example method 500 employable at a UE (e.g., UE 100₁) that facilitates one or more RLF-related actions upon BFR success, according to various aspects discussed herein. In other aspects, a machine readable medium can store instructions associated with method 500 that, when executed, can cause a UE to perform the acts of method 500.

At 510, a beam failure recovery (BFR) procedure (e.g., as discussed herein in connection with FIG. 2) can be completed.

At 520, in response to the completed BFR procedure, one or more actions can be performed that are associated with a RLF procedure, for example, stopping the T310 timer of the RLF procedure or resetting the N310 counter of the RLF procedure.

Additionally or alternatively, method 500 can include one or more other acts described herein in connection with various embodiments related to actions upon BFR success.

BFR/RLF Association: Revise RLF Parameters According to BFR Mechanism

In addition, in scenarios wherein the UE 100₁ has a strong BFR mechanism that guarantees BFR has a high chance of success (for example, the UE 100₁ detects/records several candidate beams, or as otherwise discussed herein), one or more RLF parameters can be revised, for example, the UE can one or more of: (1) Increase the value of T310; (2) Increase the value of N310; (3) Increase the threshold of RLF out-of-sync indication; (4) Decrease the value of N311; and/or (5) Decrease the threshold of RLF in-sync indication.

In various embodiments, a strong BFR mechanism can be considered as one or more of the following scenarios: (1) BFR is enabled at the UE 100₁; (2) CF (Contention Free)—PRACH (Physical Random Access Channel) or PUCCH (Physical Uplink Control Channel) based BFR is enabled at the UE 100₁; and/or (3) Contention Free PRACH (CF-PRACH) or PUCCH based BFR is enabled at the UE 100₁ when one or more parameters are configured below or above a threshold (e.g., a BFR timer is larger than a threshold, a number of BFR request (re)transmission is larger than a threshold, a number of CF-PRACH resources is larger than a threshold).

Revising different RLF parameters can have different implications and/or effects. For example, an increase in the value(s) T310 and/or N310 can indicate that, when a strong BFR mechanism above is configured, UE 100₁ can expect the value of T310 is not less than an associated threshold and/or the value of N310 is not less than an associated threshold. As another example, a decrease in the value of N311 can indicate that, when a strong BFR mechanism above is configured, UE 100₁ can expect the value of N311 should be less than a threshold.

Figure 6:
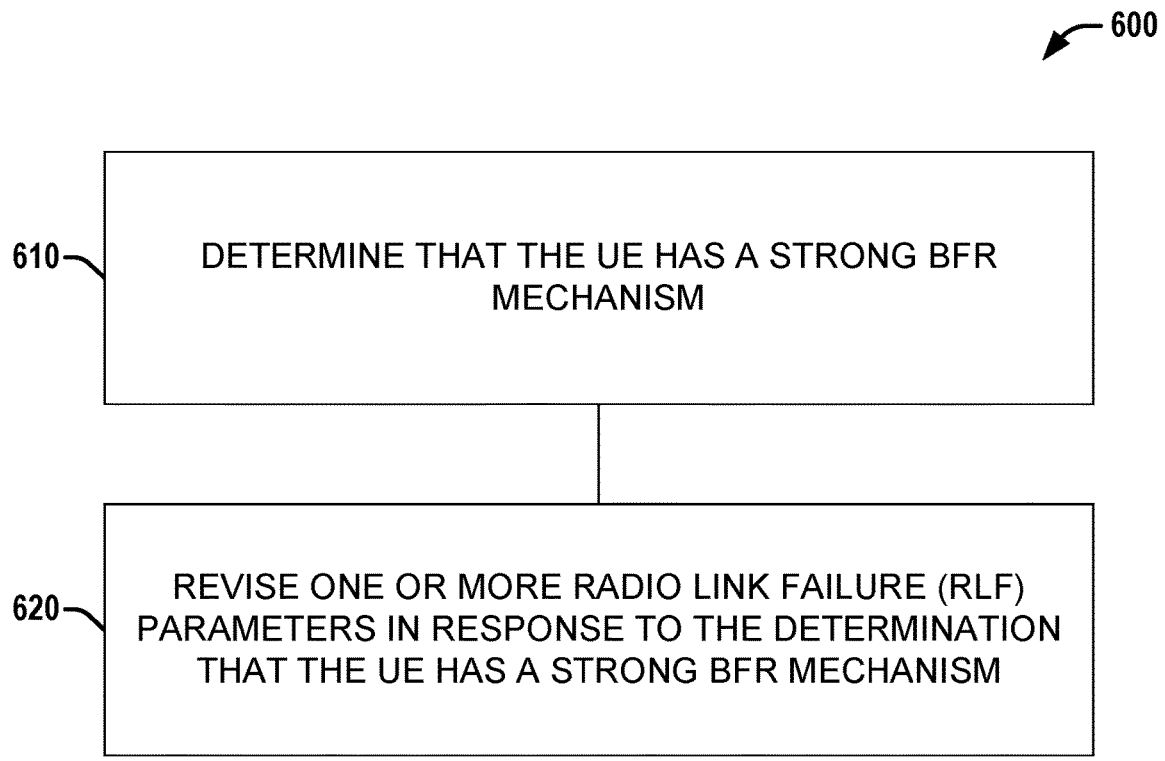
FIG. 6 is a flow diagram illustrating an example method employable at a UE that facilitates revising one or more RLF parameters based on a successful BFR procedure, according to various aspects discussed herein.

Referring to FIG. 6, illustrated is a flow diagram of an example method 600 employable at a UE (e.g., UE 100₁) that facilitates revising one or more RLF parameters based on a successful BFR procedure, according to various aspects discussed herein. In other aspects, a machine readable medium can store instructions associated with method 600 that, when executed, can cause a UE to perform the acts of method 600.

At 610, a determination can be made that the UE has a strong BFR mechanism (e.g., based on one or more characteristics discussed above).

At 620, in response to the determination that the UE has a strong BFR mechanism, one or more actions RLF parameters can be revised (e.g., Increase the value of T310; Increase the value of N310; Increase the threshold of RLF out-of-sync indication; Decrease the value of N311; Decrease the threshold of RLF in-sync indication, etc.).

Additionally or alternatively, method 600 can include one or more other acts described herein in connection with various embodiments related to revising one or more RLF parameters based upon a successful BFR procedure.

Additional Embodiments

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

In a first example embodiment, in 5G NR, a RLF mechanism can be enhanced and/or associated with a BFR mechanism accordingly.

A second example embodiment can comprise the first example embodiment, wherein one or both of a first or a second BRF/RLF association can be employed. In a first BFR/RLF association, one or more of the following actions can be performed by a UE 100₁ upon BFR success: (a) If Timer T310 has been triggered and is not expired, the UE 100₁ can stop Timer T310 and/or (b) If radio link monitoring is still in process and out-of-sync detection does not reach N310, the UE 100₁ can reset counter N310. In a first BFR/RLF association, one or more of the following RLF parameters can be revised by a UE 100₁ upon BFR success: (1) Increase the value of T310; (2) Increase the value of N310; (3) Increase the threshold of RLF out-of-sync indication; (4) Decrease the value of N311; and/or (5) Decrease the threshold of RLF in-sync indication.

The following are additional example embodiments.

Example 1 is an apparatus configured to be employed in a UE (User Equipment), comprising: a memory interface; and processing circuitry configured to: complete a beam failure recovery (BFR) procedure; and in response to the completed BFR procedure, one or more of stop a first timer associated with a radio link failure (RLF) procedure or reset a first counter associated with the RLF procedure.

Example 2 comprises the subject matter of any variation of any of example(s) 1, wherein, when the BFR procedure is completed, the RLF procedure comprises radio link monitoring, wherein a number of detected out-of-sync (OOS) indications is tracked by the first counter associated with the RLF procedure.

Example 3 comprises the subject matter of any variation of any of example(s) 2, wherein the number of detected OOS indications tracked by the first counter associated with the RLF procedure is less than N310, wherein N310 is a positive integer.

Example 4 comprises the subject matter of any variation of any of example(s) 2, wherein the processing circuitry is configured to, in response to the completed BFR procedure, reset the first counter via resetting the number of detected OOS indications tracked by the first counter to zero.

Example 5 comprises the subject matter of any variation of any of example(s) 1-4, wherein, when the BFR procedure is completed, the RLF procedure comprises tracking a number of in-sync indications by a second counter associated with the RLF procedure while the first timer is running.

Example 6 comprises the subject matter of any variation of any of example(s) 5, wherein the first timer is configured to run until it reaches a value of T310, and wherein the processing circuitry is configured to, in response to the completed BFR procedure, stop the first timer and resume radio link monitoring.

Example 7 comprises the subject matter of any variation of any of example(s) 1-6, wherein the processing circuitry is further configured to generate a BFR request, and wherein the processing circuitry being configured to complete the BFR procedure comprises the processing circuitry being configured to process a response to the BFR request generated by the processing circuitry.

Example 8 is an apparatus configured to be employed in a UE (User Equipment), comprising: a memory interface; and processing circuitry configured to: make a determination that the UE has a strong beam failure recovery (BFR) mechanism; and in response to the determination that the UE has a strong BFR mechanism, revise one or more radio link failure (RLF) parameters associated with a RLF procedure.

Example 9 comprises the subject matter of any variation of any of example(s) 8, wherein the processing circuitry is configured to make a determination that the UE has a strong BFR mechanism based at least in part on a determination that BFR is enabled.

Example 10 comprises the subject matter of any variation of any of example(s) 8-9, wherein the processing circuitry is configured to make a determination that the UE has a strong BFR mechanism based at least in part on a determination that one or more of a CF (Contention Free)—PRACH (Physical Random Access Channel)-based BFR is enabled or a PUCCH (Physical Uplink Control Channel)-based BFR is enabled.

Example 11 comprises the subject matter of any variation of any of example(s) 8-10, wherein the processing circuitry is configured to make a determination that the UE has a strong BFR mechanism based at least in part on a determination that one or more of a CF (Contention Free)—PRACH (Physical Random Access Channel)-based BFR is enabled or a PUCCH (Physical Uplink Control Channel)-based BFR is enabled when one or more BFR parameters, when one or more of a BFR timer is larger than a first threshold value, a number of BFR request retransmissions is larger than a second threshold, or a number of CF-PRACH resources is larger than a third threshold.

Example 12 comprises the subject matter of any variation of any of example(s) 8-11, wherein the one or more RLF parameters comprises a value T310 of a T310 timer, and wherein the processing circuitry is configured to revise the one or more RLF parameters via increasing the value T310.

Example 13 comprises the subject matter of any variation of any of example(s) 8-12, wherein the one or more RLF parameters comprises a value N310 of a N310 counter, and wherein the processing circuitry is configured to revise the one or more RLF parameters via increasing the value N310.

Example 14 comprises the subject matter of any variation of any of example(s) 8-13, wherein the one or more RLF parameters comprises a threshold RSRP (Reference Signal Received Power) for determining a RLF out-of-sync (OOS) indication, and wherein the processing circuitry is configured to revise the one or more RLF parameters via increasing the threshold RSRP for determining the RLF OOS indication.

Example 15 comprises the subject matter of any variation of any of example(s) 8-14, wherein the one or more RLF parameters comprises a value N311 of a N311 counter, and wherein the processing circuitry is configured to revise the one or more RLF parameters via decreasing the value N311.

Example 16 comprises the subject matter of any variation of any of example(s) 8-15, wherein the one or more RLF parameters comprises a threshold RSRP (Reference Signal Received Power) for determining a RLF in-sync indication, and wherein the processing circuitry is configured to revise the one or more RLF parameters via decreasing the threshold RSRP for determining the RLF in-sync indication.

Example 17 is a machine readable medium comprising instructions that, when executed, cause a User Equipment (UE) to: complete a beam failure recovery (BFR) procedure; and in response to the completed BFR procedure, one or more of stop a T310 timer associated with a radio link failure (RLF) procedure or reset a N310 counter associated with the RLF procedure.

Example 18 comprises the subject matter of any variation of any of example(s) 17, wherein, when the BFR procedure is completed, the RLF procedure comprises radio link monitoring, wherein a number of detected out-of-sync (OOS) indications is tracked by the N310 counter associated with the RLF procedure.

Example 19 comprises the subject matter of any variation of any of example(s) 17, wherein the instructions, when executed, cause the UE to, in response to the completed BFR procedure, reset the N310 counter associated with the RLF procedure.

Example 20 comprises the subject matter of any variation of any of example(s) 17, wherein, when the BFR procedure is completed, the RLF procedure comprises tracking a number of in-sync indications by a N311 counter associated with the RLF procedure while the T310 timer is running, wherein the T310 timer is configured to run until it reaches a value of T310, and wherein the instructions, when executed, cause the UE to, in response to the completed BFR procedure, stop the T310 timer and resume radio link monitoring.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory interface; and processing circuitry configured to: perform any of the described operations of examples 1-20.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
complete a beam failure recovery (BFR) procedure; and
in response to the completed BFR procedure, reset a first counter associated with a radio link failure (RLF) procedure, wherein the RLF procedure comprises radio link monitoring, where a number of detected out-of-sync (OOS) indications is tracked by the first counter, and the first counter is reset by resetting the number of detected OOS indications tracked by the first counter to zero.

2. The apparatus of claim 1, wherein the number of detected OOS indications tracked by the first counter associated with the RLF procedure is less than N310, wherein N310 is a positive integer.

3. The apparatus of claim 2, wherein the first counter is reset in response to completing the BFR and the first counter is reset before the first counter reaches a configured integer count of a number of detected out-of-sync (OOS) indications.

4. The apparatus of claim 1, wherein, when the BFR procedure is completed, the RLF procedure comprises tracking a number of in-sync indications by a second counter associated with the RLF procedure while a first timer associated with the RLF procedure is running.

5. The apparatus of claim 4, wherein the first timer is configured to run until it reaches a value of T310, and wherein the processing circuitry is configured to, in response to the completed BFR procedure, stop a first timer associated with the RLF procedure, and resume radio link monitoring.

6. The apparatus of claim 4, wherein in response to completing the BFR procedure, the first timer associated with the RLF procedure is stopped and the first counter associated with the RLF procedure is reset.

7. The apparatus of claim 1, wherein the processing circuitry is further configured to generate a BFR request, and wherein the processing circuitry being configured to complete the BFR procedure comprises the processing circuitry being configured to process a response to the BFR request generated by the processing circuitry.

8. A non-transitory machine readable medium comprising instructions that, when executed, cause a User Equipment (UE) to: complete a beam failure recovery (BFR) procedure;

and in response to the completed BFR procedure, stop a T310 timer associated with a radio link failure (RLF) procedure, wherein the RLF procedure comprises: tracking a number of in-sync indications by a N311 counter associated with the RLF procedure while a T310 timer associated with the RLF procedure is running, wherein the T310 timer is configured to run until it reaches a value of the T310.

9. The non-transitory machine readable medium of claim 8, wherein, when the BFR procedure is completed, the RLF procedure comprises radio link monitoring, wherein a number of detected out-of-sync (OOS) indications is tracked by a N310 counter associated with the RLF procedure.

10. The non-transitory machine readable medium of claim 8, wherein the instructions, when executed, cause the UE to, in response to the completed BFR procedure, reset a N310 counter associated with the RLF procedure.

11. A baseband processor of a user equipment (UE), comprising:
   a memory; and
   one or more processors configured to, when executing instructions stored in the memory, cause the UE to:
      complete a beam failure recovery (BFR) procedure; and
      in response to the completed BFR procedure, reset a first counter associated with a radio link failure (RLF) procedure, wherein the RLF procedure comprises radio link monitoring, where a number of detected out-of-sync (OOS) indications is tracked by the first counter, and the first counter is reset by resetting the number of detected OOS indications tracked by the first counter to zero.

12. The baseband processor of claim 11, wherein the number of detected OOS indications tracked by the first counter associated with the RLF procedure is less than N310, wherein N310 is a positive integer.

13. The baseband processor of claim 12, wherein the first counter is reset in response to completing the BFR and the first counter is reset before the first counter reaches a configured integer count of a number of detected out-of-sync (OOS) indications.

14. The baseband processor of claim 11, wherein, when the BFR procedure is completed, the RLF procedure comprises tracking a number of in-sync indications by a second counter associated with the RLF procedure while a first timer associated with the RLF procedure is running.

15. The baseband processor of claim 14, wherein the first timer is configured to run until it reaches a value of T310, and wherein the one or more processors are further configured to, in response to the completed BFR procedure, stop the first timer and resume radio link monitoring.

* * * * *